Figure 1:
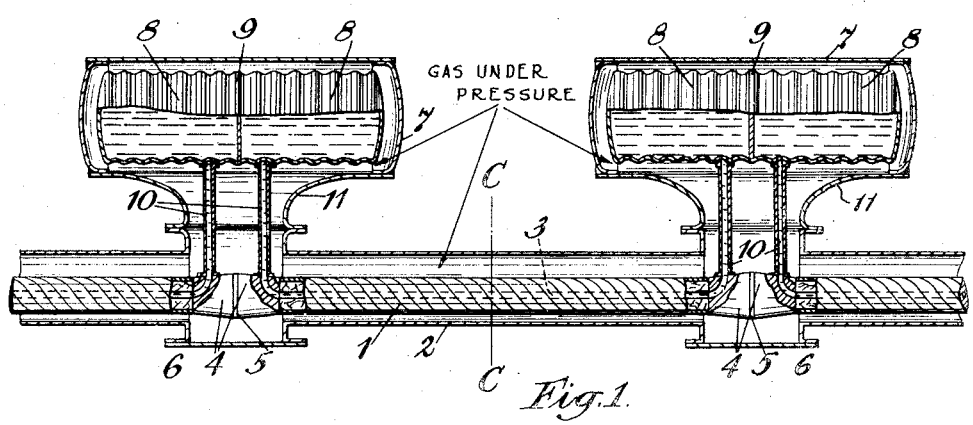

Nov. 26, 1935.  M. HOCHSTADTER  2,021,998

ELECTRIC CABLE INSTALLATION

Filed Nov. 14, 1932

M. Hochstadter
INVENTOR

By: Marks & Clerk
ATTYS.

Patented Nov. 26, 1935

2,021,998

UNITED STATES PATENT OFFICE 2,021,998

ELECTRIC CABLE INSTALLATION

Martin Hochstadter, Brussels, Belgium, assignor, by mesne assignments, to Protona A. G., Basel, Switzerland Application November 14, 1932, Serial No. 642,627
In Germany November 19, 1931

4 Claims. (Cl. 247—3)

This invention relates to an electric cable installation, in which electric cables are pulled through pressure pipe lines and are subjected therein to the pressure of a pressure medium which is separate from the di-electric.

By using a pressure gas, the stability of the cables is greatly increased and it has been found that their permanent di-electric strength is thereby increased to twice or three times the value of the di-electric strength when no pressure is employed, so that a di-electric strength is obtained of a value which could not hitherto be secured. Gas pressures of 5-15 atms. have been found suitable; in order to obtain the maximum permanent di-electric strength, a minimum pressure of 8-12 atms. is required according to the thickness of the lead sheathing and other circumstances.

The advantages of a cable installation of the kind above referred to hold good not only as regards cables which have been filled with a compound insulation but also in the case of so-called oil-filled cables, that is to say cables with oil circulation. However, owing to the properties of the oil-filled cables, difficulties arise which it is the object of the present invention to avoid.

In the case of oil-filled cables, the impregnating material consists of a thin oil and the cable is provided with longitudinal ducts in which the said thin oil can circulate. Further, such cables are subdivided into short sections by expansion vessels which receive the oil from the cable and return it to it according to the heating and cooling conditions.

It is also essential that at least atmospheric pressure should be maintained throughout in such oil-filled cables and expansion vessels associated therewith. Generally the excess pressure amounts to a fraction of an atmosphere. It is not possible to obtain substantially higher excess pressures without the use of special means because the lead sheathing could not resist such an internal pressure.

Further advantages can be secured for the cable installations of the kind referred to if use is made of oil-filled cables in so far as the oil circulation can be made more intensive and rapid and that papers of greater density can be employed for the insulation than is generally admissible and usual in oil-filled cables.

The use of pressure pipe lines in connection with oil-filled cables encounters the main difficulty that in the case of gas pressures of 8-12 atms. and more, a sudden disappearance of the pressure in a section of the pipe line may lead to the bursting of the cable. This is due to the fact that naturally also the expansion vessels must, during the operation, receive this high pressure through the oil ducts and maintain it and that the pressure which accordingly exists in the oil duct of the cable and in the expansion vessels associated therewith suddenly becomes an internal excess pressure when the pressure in the pressure duct ceases.

The object of the present invention is to avoid this drawback and thereby render the principle of the pressure pipe line applicable also to oil-filled cables. This is attained by the provision of means which automatically ensure that the pressure in the oil ducts and in the expansion vessels shall not exceed the pressure existing at any particular moment in the pressure duct and that it shall cease simultaneously with the said pressure. The simplest way of obtaining this result is to arrange that the expansion vessels should be in communication with the continuous pressure duct, so that the pressure therein shall be produced directly by the pressure medium in the pressure duct. However, when the pressure in the expansion vessels is produced by the pressure medium indirectly, that is to say over the cable and its oil duct, then the expansion vessels must at least be in communication with the pressure duct through valve-like members in such a manner that when the pressure in the pressure duct drops, the said valves also cause a pressure drop in the expansion vessels by allowing the pressure gas to escape.

Fig. 1 of the accompanying drawing illustrates in sectional elevation a section of a pressure cable installation containing an oil-filled cable and the two joints at the ends of said section, joining the section with the neighbouring sections, the joint being of the type in which the pressure pipe-line is in communication with the oil expansion vessel, allowing the pressure gas in the pressure pipe line to act continuously on the expansion vessel.

Figure 2:
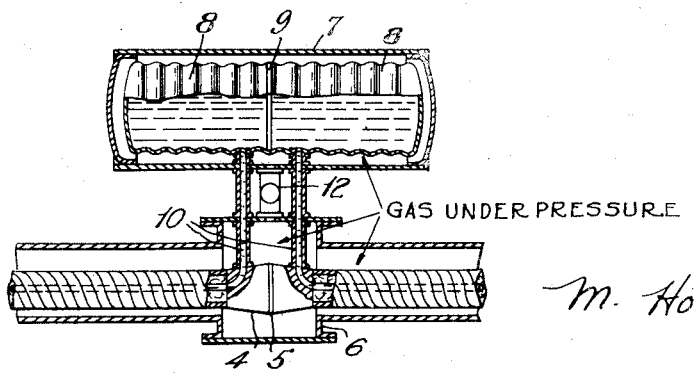

Fig. 2 illustrates in sectional elevation part of an installation in which the joint is of the type in which the pressure pipe line is not in continuous communication with the oil expansion vessel, but where there is a connection between the pressure pipe line and the oil expansion vessel containing a valve to equalize the pressures in the pressure pipe line and in the oil expansion vessel when a difference between these two pressures arises.

Figure 3:

Figure 3 shows a cross section through the pressure pipe line along the line C—C in Fig. 1.

I is the cable, 2 the pressure pipe, 3 the oil channel within the cable, 4 the cable joint which is shown as being a stop joint with a partition at 5, 6 the joint of the pipe line, 7 the oil expansion vessel, 8 the collapsible oil container, 9 the partition of the latter into halves corresponding to the partition 5 of the stop joint 4, and 10 are the connections between the oil channel of a cable and the respective collapsible oil containers 8. In Fig. 1, 11 is the communication sleeve between the pressure channel of the pipe line and the gas pressure chamber of the expansion vessel 7, and in Fig. 2, 12 is the valve-like member inserted between the joint sleeve 6 of the pressure pipe line and the expansion vessel 7.

In the construction shown in Fig. 1, the pressure gas in the pipe line acts, through the communication 11, continuously and directly upon the collapsible oil chamber 8, thereby producing the pressure in the latter and therefrom further in the oil channels of the cable section. Therefore, the pressure in the expansion vessel and the oil channel connected therewith must always be the same as the pressure of the gas in the pressure pipe line. On the other hand, in the construction shown in Fig. 2, the gas in the pressure pipe line cannot act continuously and directly upon the collapsible oil chamber 8, because the oil vessel 7 is not in communication with the pressure gas in the pipe line during normal operation when the valve 12 is closed. Therefore, the pressure in the pipe line acting upon the cable produces and sets up a like pressure in the oil channel 3 and therefrom in the collapsible oil chamber 8 through the oil connections 10. The pressure in the pipe line thus produces the pressure in the expansion vessel indirectly. Only in the case of a sudden difference arising between the pressures in the pipe line and the oil expansion vessel, such as by a fault in the pipe line, will the valve 12, which may be of any known type, open and allow the two pressures to equalize.

It will, therefore, be understood that in the operation of the arrangement shown in Fig. 2, the pressure in the pipe line compresses the cable, whereby the pressure is radially transmitted through the insulation wall to the oil in the channel 3 and passage 10 and thereupon to the oil containing vessel 8. This transmission of pressure is accompanied by a corresponding flow of oil into the vessel 8, and is, naturally, comparatively slow, as is, consequently, also the transmission of the pressure from the oil vessel 8 to the gaseous medium in the casing 7, which is thereby compressed. When a fault arises in the pipe line, and the pressure therein drops suddenly, the process of pressure transmission just referred to would be reversed and tend to expand the cable and the sheathing of the cable would eventually be endangered. However, this is prevented by the provision of the valve 12 adapted to open on the occurrence of a sudden difference in pressure between the pipe line and casing 7; the reason being that, when such sudden pressure difference is produced by the sudden drop in pressure in the pipe line, and the valve 12 opens, the gaseous medium in the casing 7 suddenly flows into the pipe line, and the oil vessel 8 is relieved of the pressure exerted thereon by the gaseous medium in the casing 7, with the result that the oil will not flow from the vessel 8 into the oil channel 3 and that the cable, therefore, will not expand and will not be exposed to local bursting.

What I claim is:—

1. An electric cable installation comprising a continuous pipe line, a cable within the pipe line having oil-filled ducts, a pressure medium within the pipe line surrounding the cable, oil expansion vessels distributed in sections along the pressure pipe line, means of communication between the oil expansion vessels and the pipe line, and means which automatically insure that the pressure in the oil ducts and expansion vessels shall never exceed the pressure of the pressure medium in the pressure pipe line, said means of communication between the pipe line and the oil expansion vessels being such as to cause the pressure medium in the pressure pipe line to act continuously on the oil expansion vessels.

2. An electric cable installation comprising a pipe line, a cable within the pipe line having oil-filled ducts, a pressure gas within the pipe line surrounding the cable, oil expansion vessels each comprising an outer container and a collapsible container within the said outer container, means of communication between one of these containers and the oil ducts in the cable and means of communication between the other container and the pipe line containing the pressure gas to enable the pressure of the gas to act on the oil through the intermediary of the wall of the collapsible container so as automatically to ensure that the pressure in the oil ducts and expansion vessels shall never exceed the pressure of the gas in the pressure pipe line.

3. An electric cable installation comprising a pipe line, a cable within the pipe line having oil filled ducts, a pressure gas within the pipe line surrounding the cable, oil expansion vessels each comprising an outer container and a collapsible container within said outer container, means of communication between one of these containers and the oil ducts in the cable, and means of communication between the other container and the pipe line containing the pressure gas to automatically insure that the pressure in the oil ducts and expansion vessels shall never exceed the pressure of the gas in the pressure pipe line.

4. An electric cable installation comprising a pipe line, a cable within the pipe line hoving oil filled ducts, a pressure medium within the pipe line surrounding the cable, oil expansion vessels distributed in sections along the pressure pipe line, means of communication between the oil expansion vessels and the pipe line, means which automatically insure that the pressure in the oil ducts and expansion vessels shall never exceed the pressure of the pressure medium in the pressure pipe line, the last mentioned means including valves in the means of communication between the pipe line and the oil expansion vessels for relieving the pressure in the expansion vessels when the pressure in the pipe line ceases or drops below a certain limit.

MARTIN HOCHSTADTER.